No. 617,182. Patented Jan. 3, 1899.
J. A. PLATT & F. C. DOS PASSOS.
RAZOR STROPPING AND HONING APPARATUS.
(Application filed Mar. 29, 1898.)

(No Model.)

WITNESSES:
Edward Thorpe

INVENTORS:
J. A. Platt
F. C. Dos Passos
BY
ATTORNEYS.

UNITED STATES PATENT OFFICE.

JOHN A. PLATT AND FERNANDO C. DOS PASSOS, OF AUGUSTA, GEORGIA.

RAZOR STROPPING AND HONING APPARATUS.

SPECIFICATION forming part of Letters Patent No. 617,182, dated January 3, 1899.

Application filed March 29, 1898. Serial No. 675,641. (No model.)

*To all whom it may concern:*

Be it known that we, JOHN A. PLATT and FERNANDO C. DOS PASSOS, of Augusta, in the county of Richmond and State of Georgia, have invented a new and Improved Razor Stropping and Honing Apparatus, of which the following is a full, clear, and exact description.

The object of our invention is to provide a rotary stropping and honing apparatus for razors and other blades in which a blade may be securely held and its edge at both sides be subjected to the rolling action of sharpening-surfaces.

Another object of the invention is to provide a means for operating the sharpening-surfaces that will insure said surfaces being properly presented to the blade whenever the apparatus is operated.

A further object of the invention is to employ but few parts and to construct the apparatus so that it will be simple, durable, and economic and may be expediously operated by any one of ordinary intelligence.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
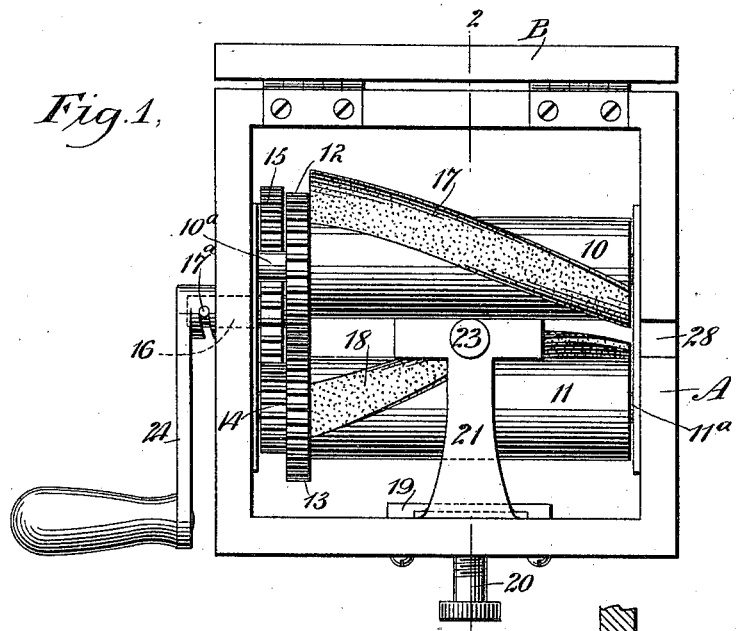
Figure 2:
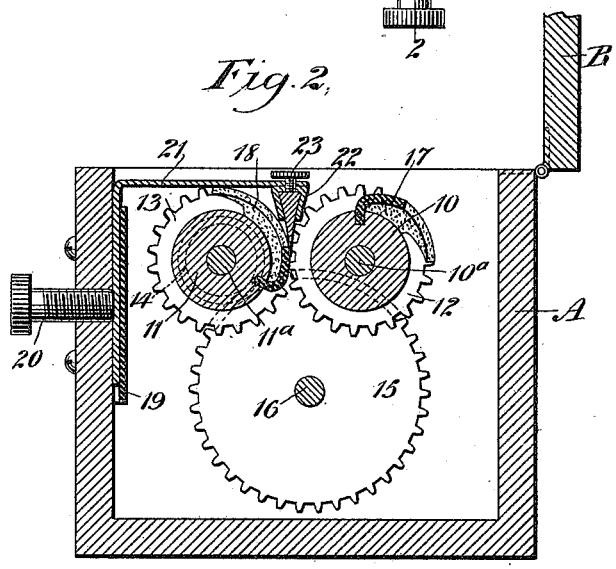
Figure 3:
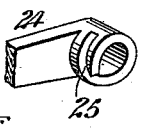
Figure 4:
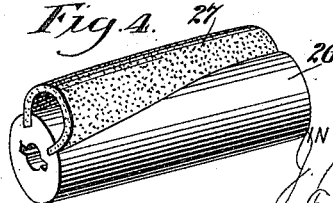

Figure 1 is a plan view of the apparatus, the cover being open. Fig. 2 is a vertical section on the line 2 2 of Fig. 1. Fig. 3 is a perspective view of a portion of the handle employed, and Fig. 4 is a perspective view of a roller for the machine adapted for honing.

A represents a box, and B the cover therefor. Two rollers 10 and 11 are journaled in the box A, ordinarily near the top, the two rollers being laterally parallel and preferably of the same diameter. Each roller is mounted on a shaft, the shafts being designated, respectively, as $10^a$ and $11^a$. The shaft may be round and the rollers secured thereto by a pin or otherwise, or the shafts may be provided with longitudinal feathers, in which event suitable openings in the rollers to receive the feathered shafts are provided, as shown in Fig. 4. Each roller 10 and 11 at one of its ends is provided with a gear, the gears being designated as 12 and 13. These gears are of the same size and mesh one with the other.

On the shaft of the roller 11, for example, a pinion 14 is secured, and this pinion meshes with a large gear 15, secured on a shaft 16, journaled in the lower portion of the box, usually at its center. The shaft 16 extends out through one side of the box and is provided with a pin $17^a$, as shown in Fig. 1. When the rollers are to be used for simply stropping a blade, each roller is provided with a spirally-arranged leaf of leather or other suitable material, one longitudinal edge of each leaf being secured in the roller in which it belongs, the opposite longitudinal edge being free, so as to afford proper resilience thereto. The leaf on the roller 10 is designated in the drawings as 17 and the leaf on the roller 11 as 18. When the rollers are in their initial position, or in position to receive between them the blade to be sharpened, the leaf 18, for example, will be nearer the blade than the leaf 17, and both leaves are so placed on the rollers that when the rollers are in their initial positions said leaves will converge at one end and diverge at the opposite end of the rollers.

The shaft 16 extends out at one side of the box, and within the box, at what may be termed the "front," a staple-like plate 19 is secured, and a set-screw 20 is carried in the box into a socket formed by the said plate. The socket of the said plate is adapted to receive the vertical member of the angle-bracket 21, the horizontal member whereof extends over the space between the rollers 10 and 11 at the center. A clamp 22 is secured to the horizontal member of the bracket 21 immediately over the longitudinal center of the space between the rollers, the said clamp being adapted to receive between its jaws the back portion of the blade to be sharpened, and preferably the jaws of the clamp incline toward each other, and the blade is held in place by a set-screw 23. A crank-handle 24 is used to turn the shaft 16, and the crank-handle is provided with a hub having a spiral slot 25 made therein. The said slot when the hub is fitted on the upper end of the shaft 16 receives the pin $17^a$ of the shaft, so that if the handle is not turned in a direction that will keep the pin against the inner end of the slot the handle will slip from off the shaft.

A set of insertible rollers 26 may be provided to take the place of the rollers 10 and 11. The said rollers 26 being designed to be used for honing or for coarse sharpening, the sharpening-surface 27, of a suitable grit, is diagonally placed, as heretofore described, and preferably the said surface consists of a strip of leather bent upon itself to a semitubular form, both longitudinal edges of the strip being secured in the roller and the outer surface of the leather coated with a honing preparation, as shown in Fig. 4. A slot 28 is made in the upper edge of the box, which will enable the blade of the razor or the shank portion of the blade to drop downward within the box when the bracket 21 is adjusted to bring the edge of the blade between the rollers, so that it will be acted upon by the sharpening-surfaces of the same.

It will be observed that the sharpening-surfaces are turned in connection with each other and that they have a longitudinal stropping action on the edge of the blade, and when the sharpening-surfaces on the rollers are arranged relative to each other as shown one of the sharpening-surfaces will have nearly passed the blade before the other sharpening-surface is brought in contact with the blade, so that the blade is alternately stropped on each side of the same. The sharpening-surfaces of the rollers may have any desired form of dressing applied thereto.

Having thus described our invention, we claim as new and desire to secure by Letters Patent—

1. In a machine for stropping and honing razors and the like, a roller provided with a spirally-arranged leaf of flexible material secured at its longitudinal edge or edges to said roller, and forming a resilient sharpening-surface, substantially as described.

2. In a machine for stropping and honing razors and the like, parallel rotary rollers each provided with a spirally-arranged leaf of flexible material secured at its longitudinal edge or edges to said roller and forming resilient sharpening-surfaces, the sharpening-surfaces converging at one end of the rollers and diverging at the opposite ends of said rollers, substantially as described.

3. In a machine for stropping and honing razors and the like, the combination with a support, of parallel rollers mounted in the frame and each provided with a spirally-arranged leaf of flexible material secured at its longitudinal edge or edges to said roller forming resilient sharpening-surfaces, the sharpening-surfaces converging at one end of the rollers and diverging at the opposite ends of said rollers, means for rotating the rollers, and an adjustable holder arranged above and between said rollers, substantially as described.

4. A machine for stropping and honing razors, comprising a box having a cover, parallel rollers mounted in the box and each provided with a spirally-arranged leaf of flexible material secured at its longitudinal edge or edges forming resilient sharpening-surfaces, gearing for operating the rollers, and a bracket adjustably secured to one side of the box and carrying a clamp for clamping and holding a razor, substantially as described.

5. A machine for stropping and honing razors, consisting of a box having a hinged cover, parallel rollers mounted in the box and each provided with a spirally-arranged leaf of flexible material secured at one longitudinal edge to the roller forming resilient sharpening-surfaces, the sharpening-surfaces converging at one end of the rollers and diverging at the opposite ends of said rollers, gearing for operating the said rollers, an angle-bracket secured to the box and having its horizontal member projecting inwardly and a razor-clamp on the free end of said horizontal member of said bracket, substantially as herein shown and described.

JOHN A. PLATT.
FERNANDO C. DOS PASSOS.

Witnesses:
 MARION JONES,
 H. P. SHEWMAKE.